United States Patent [19]

Imaizumi et al.

[11] Patent Number: 5,223,939
[45] Date of Patent: Jun. 29, 1993

[54] PRINTER HAVING A MARK PRINTING FUNCTION FOR PRINTING MARKS INDICATIVE OF CUT POSITIONS

[75] Inventors: Mamoru Imaizumi; Makoto Suzuki, both of Nagoya, Japan

[73] Assignee: Brother Kogyo Kabushiki Kaisha, Nagoya, Japan

[21] Appl. No.: 826,456

[22] Filed: Jan. 27, 1992

[30] Foreign Application Priority Data

Apr. 16, 1991 [JP] Japan .................. 3-112381

[51] Int. Cl.⁵ .................. H04N 1/23; H04N 1/387
[52] U.S. Cl. .................. 358/296; 358/449; 358/450; 395/117; 355/311
[58] Field of Search .......... 358/296, 304, 434, 438, 358/448, 449, 450, 453, 452; 355/218, 244, 311; 395/102, 117

[56] References Cited

U.S. PATENT DOCUMENTS

| | | | |
|---|---|---|---|
| 4,811,109 | 3/1989 | Shimizu et al. | 358/453 |
| 4,908,672 | 3/1990 | Ito | 355/311 |
| 4,964,070 | 10/1990 | Markoff et al. | 395/102 |
| 4,965,590 | 10/1990 | Yamazaki | 346/136 |
| 5,040,022 | 8/1991 | Kinoshita et al. | |
| 5,068,743 | 11/1991 | Araki | 358/304 |

Primary Examiner—Edward L. Coles, Sr.
Assistant Examiner—Scott A. Rogers
Attorney, Agent, or Firm—Oliff & Berridge

[57] ABSTRACT

Image data supplied from an external equipment is stored in an image data memory. The size of an outline region determined on the basis of the image data is compared with the size of the printable region of selected paper, stored in a size memory. If the outline region is larger, paper having a size larger than that of the selected paper is selected. Data of linear marks indicative of cut positions on the extension lines of virtual boundaries of the outline region is calculated on the basis of data of a pair of corners in the image data, to be synthesized with the image data supplied from the external equipment, for a print operation with respect to the print paper.

15 Claims, 7 Drawing Sheets

FIG.5B

| ITEM | INSTRUCTIONS |
|---|---|
| S100 | STORE IMAGE DATA IN IMAGE DATA MEMORY |
| S110 | DETECT PAPER SIZE |
| S120 | READ SET STATE OF MARK PRINTING |
| S130 | OE < P1E? |
| S140 | IS PAPER CASSETTE OF LARGER SIZE SET? |
| S150 | SELECT PAPER CASSETTE OF LARGER SIZE |
| S160 | OE ≦ P2E? |
| S170 | MARK PRINTING? |
| S180 | CALCULATE MARK DATA |
| S190 | PRODUCE SYNTHESIZED IMAGE DATA |
| S200 | PRINT OPERATION |
| S210 | ERROR PROCESSING |

PRINTER HAVING A MARK PRINTING FUNCTION FOR PRINTING MARKS INDICATIVE OF CUT POSITIONS

BACKGROUND OF THE INVENTION

1. Field of the Invention

The present invention relates to a printer and, more particularly, to a printer capable of printing, on a print medium, marks indicative of cut positions corresponding to an outline region including an image region together with an image.

2. Description of Related Art

Various types of printers for printing an image on print paper, for example, a laser printer and an ink jet printer, are put into practice. The printer of this type is generally connected to external equipment such as a host computer. Image data of one page supplied from the external equipment is stored in a memory while an image of one page is printed on the print paper fed from a stacker or paper cassette on the basis of the image data.

In most of the printers, the external equipment actually sends data of at least a pair of corners in a diagonal relation in the rectangular outline region defining the image region of the image to be printed in addition to the image data. An operator sets the print paper to be printed in a paper cassette or the like prior to a print operation, and selects the size of the print paper on a console panel. The controller of the printer compares the printable region of the set paper with the outline region thereof. If the outline region is smaller than the printable region, the print operation is performed.

Generally, since in print paper there are top, bottom, right and left margins where the printing cannot be performed with the restriction of a paper feeder, the operator sets print paper of a size larger than the outline region. However, a predetermined standard size is required for the size of a document to be produced. If the size of the outline region is the standard size such as A4 and B5, the operator performs the print operation with respect to the print paper larger than the outline region, and then, cuts the printed paper into a desired standard size.

In the conventional printer as described above, the print paper of a size larger than the outline region including the image region is always necessary. Accordingly, when the size of the outline region is a predetermined standard size such as A4 and B5, the operator must mark the printed paper according to the required standard size after the print operation and cut the paper, with an attendant problem such as cumbersome cutting work.

Moreover, if the outline region is considerably smaller than the standard size of the set paper with an excessive blank margin, the operator must cut the paper into a suitable size after the print operation.

SUMMARY OF THE INVENTION

It is an object of the present invention to provide a printer capable of printing, in addition to an image, marks indicative of cut positions corresponding to an outline region including an image region so as to facilitate cutting a print medium into a desired size.

A printer according to the present invention in which an image can be printed on the basis of image data and data representative of a print region supplied from the exterior comprises: an image data memory for storing the supplied image data and data of at least a pair of corners in the diagonal relation, for specifying a rectangular outline region a including an image region; print device for printing the image on a print medium on the basis of the image data stored in the image data memory; a mark data producing apparatus for producing mark data of marks to be printed on extension lines of a pair of virtual boundaries perpendicular to each other, the mark data specifying the outline region in the vicinity of at least the pair of corners in the diagonal relation on the basis of the data of the pair of corners of the outline region stored in the image data memory a; synthesizing device for synthesizing the image data supplied from the exterior into the image data memory and the mark data produced by the mark data producing apparatus so as to produce synthetic image data; and a print control structure for controlling the print device to print both the image on the basis of the image data supplied from the exterior and the marks on the basis of the mark data produced by the mark data producing apparatus according to the synthetic image data produced by the synthesizing device.

In the printer according to the present invention, when image data and data of at least a pair of corners in the diagonal relation for specifying the rectangular outline region including the image region are supplied from the exterior to be stored in the image data memory, the mark data producing apparatus produces the mark data to be printed on the extension lines of a pair of boundaries perpendicular to each other in the outline region in the vicinity of at least the pair of corners in the diagonal relation on the basis of the data of the pair of corners stored in the image data memory. The synthesizing device receives the mark data from the mark data producing apparatus and the image data from the image data memory to synthesize the image data and the mark data. The print control structure enables the print device to print the image data including the mark data. The print device prints the image on the print medium, and further, prints the mark near at least the pair of corners in the diagonal relation in the outline region.

In the printer according to the present invention, the synthesizing device synthesizes the mark data produced by the mark data producing apparatus on the basis of the data of the corners for specifyinq the rectangular outline region and the image data supplied from the exterior. The image is printed on the print medium on the basis of the synthesized image data, and the marks can be simultaneously printed in the vicinity of at least the pair of corners in the diagonal relation in the outline region. Consequently, the operator can cut the printed paper along the marks. As a result, the document of a size corresponding to the outline region can be easily obtained with remarkably simplified cutting work.

BRIEF DESCRIPTION OF THE DRAWINGS

The invention will be described in detail with reference to the following drawings, in which like reference numerals refer to like elements, and wherein:

FIGS. 5A and 5B are a schematic flowchart of a routine of print control; and

DESCRIPTION OF THE PREFERRED EMBODIMENT

One preferred embodiment will be described hereinafter with reference to the drawings.

In this embodiment, the present invention is applied to a laser printer where image data is supplied from external equipment such as a host computer and a word processor into a memory, for a print operation.

Figure 1:
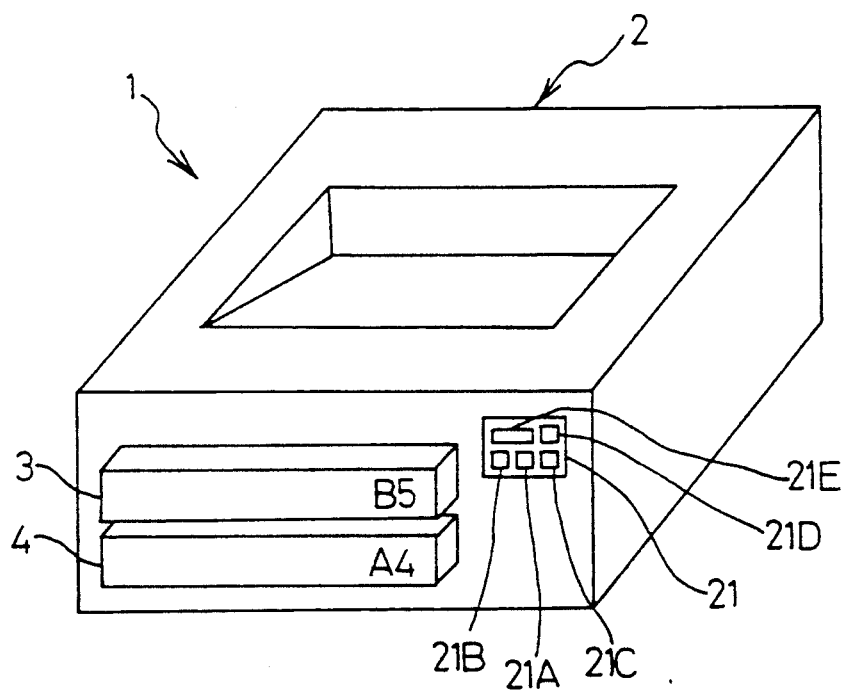
FIG. 1 is a perspective view of a printer according to the present invention.

Inside the unit frame 2 of a laser printer 1, there are provided a paper feeding/transporting mechanism for feeding and transporting print paper by a plurality of rollers, a laser scanner mechanism including polygonal mirrors and being driven by a scanner motor 30 (see FIG. 4), a process cartridge detachably disposed, a developing mechanism, a fixing mechanism and the like. The construction of the above described mechanisms is the same as that of the mechanisms of a general printer disclosed in U.S. Pat. No. 5,040,022. As shown in FIG. 1, paper cassettes 3, 4 for containing print paper P therein are detachably disposed in the unit frame 2 in two vertical stages. A stack of print paper P1 of B5 size is contained in the paper cassette 3 while a stack of print paper P2 of A4 size is contained in the paper cassette 4. In addition, a console panel 21 is formed on the front face of the unit frame 2. In the console panel 21, there are provided a set key 21A for setting a size of print paper to be printed; a switch key 21B for selectively switching on-line/off-line of a connection to the external equipment; a switch 21C for setting the number of pieces of print paper to be printed; a mark print key 21D for setting the execution of the printing of marks indicative of cut positions; and a liquid crystal display 21E for displaying a state of the print operation.

Figure 2:
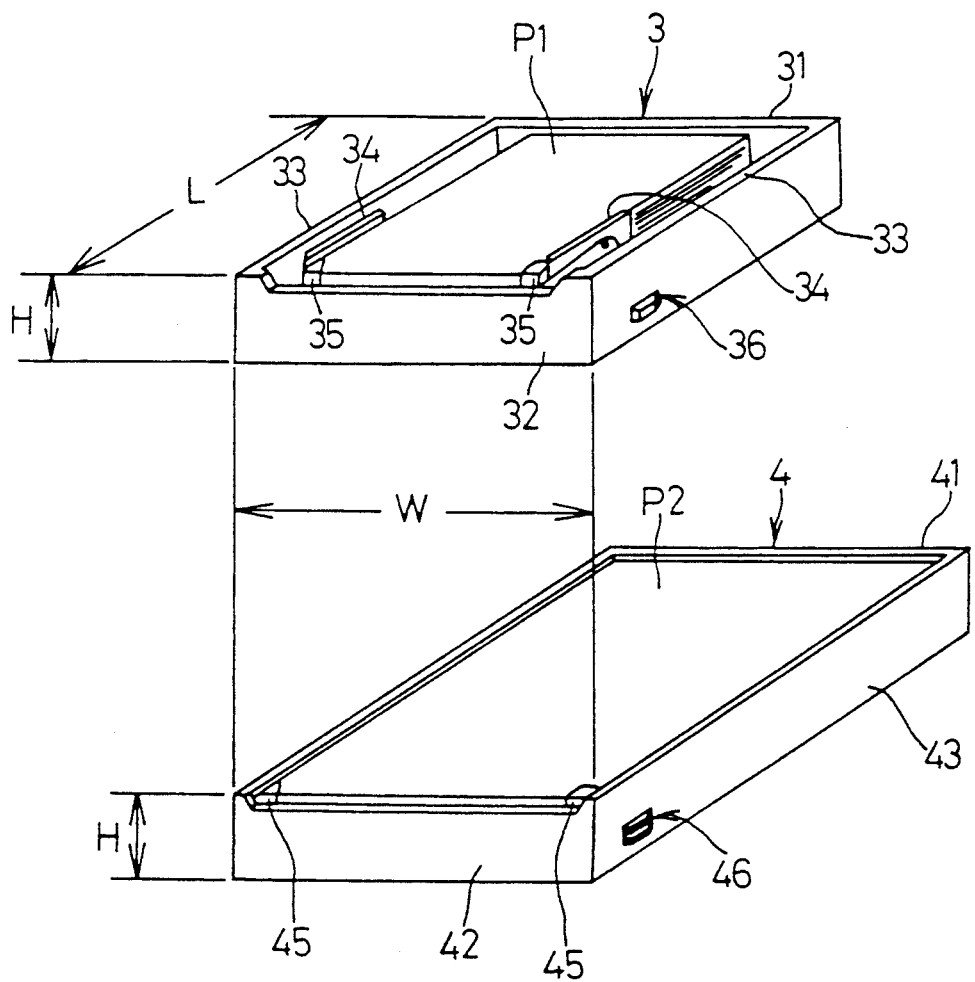
FIG. 2 is a perspective view showing paper cassettes.

FIG. 2 is a perspective view showing two types of paper cassettes that can be used for a sheet supplying device of this embodiment. The paper cassette 3 has a storage space of 15 mm height for holding cut sheets having length and width smaller than those of the cassette, such as print paper P1 of B5 size. The paper cassette 4 also has a storage space of 15 mm height and can hold another size of cut sheets, such as print paper P2 of A4 size. The paper cassettes 3, 4 are equal in width W and height H, and may be installed in either installation position. The length L of each paper cassette 3, 4 depends upon a size of the print paper. A difference in length does not disturb installation interchangeability as the dimensions defining the paper cassette are its height and width.

Each width of rear boards 31, 41 and front boards 32, 42 of the paper cassettes 3, 4 corresponds to that of the A4 size. Each length of side boards 33, 43 depends on that of the print paper. The combination of side boards 43, rear board 41 and front board 42 associated with the paper cassette 4 defines a paper cassette for A4 paper. Further, paper side edge arrangement boards 34 are installed in the paper cassette 3 for adjusting the width to hold paper of B5 size, and the side boards 33 of the paper cassette 3 are shorter than the side boards 43 of the paper cassette 4. Pairs of separation clicks 35 and 45 are provided in the cassettes 3, 4, respectively. The separation clicks 35, 45 engage the corners of the uppermost cut sheets at the leading edges in the insertion direction of the paper cassettes 3, 4, respectively. Moreover, projections 36, 46, each having a shape suitable for the paper cassette based on the size of the paper contained in the paper cassette, are formed at the same position on the outer surface of one of the side boards 33, 43 of the cassettes 3, 4. The projections press switches 37, 47 attached to the sides of the sheet supplying device shown in FIG. 3 when the paper cassettes 3, 4 are installed in the sheet supplying device. Each of the switches 37, 47 generates a signal indicating whether the cassette is installed or not. Further, a combination of projection and switch identifies the type of paper cassette installed.

Figure 3:
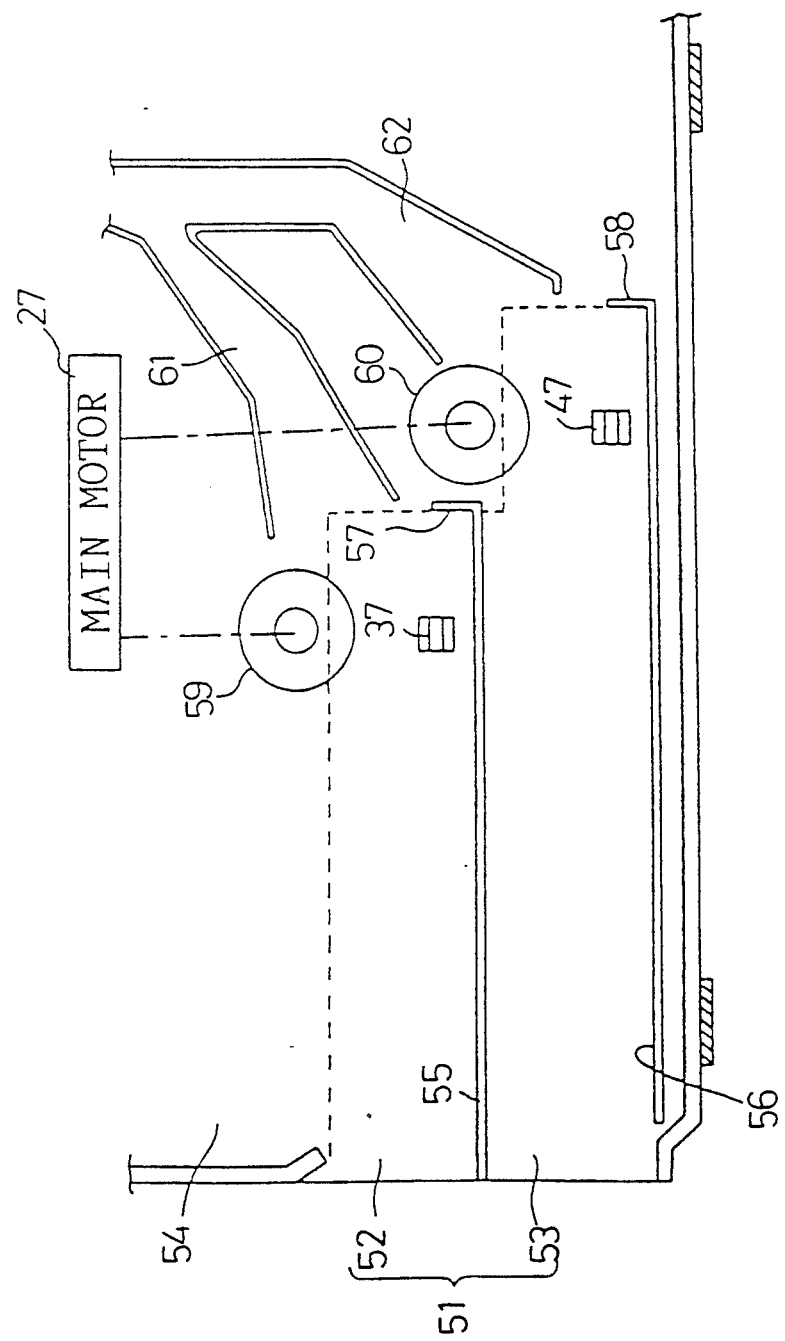
FIG. 3 is a schematic sectional view of a sheet supplying device.

FIG. 3 is a schematic sectional view of the sheet supplying device illustrating a paper cassette installation space 51 formed between a pair of side walls 54. Rails 55 are fixed to each of the side walls 54, to define an upper space 52 for installing the paper cassette 3 over a plane connecting the upper surface of the rails 55 and a lower space 53 for installing the paper cassette 4 under the plane. Rails 56 are fixed to each of the side walls 54, and serve to guide the paper cassette 4 when the paper cassette 4 is installed in the lower space 53. A stopper 57 is fixed to each rail 55, for restricting the insertion of the paper cassette 3, and a stopper 58 is fixed to each rail 56 for restricting the insertion of the paper cassette 4. The paper cassette 3 or 4 is inserted, and guided by the side boards 54 along the pair of the rails 55 or 56 until it abuts against the stopper 57 or 58, respectively.

As shown in FIG. 3, the cassette installed in the lower space 53 is inserted into the sheet supplying device deeper than the paper cassette 3 installed in the upper space 52 is. To one of the side walls 54 defining the cassette installation space are attached the switches 37, 47, each for detecting the presence of the paper cassette and identifying the type of the paper cassette installed. The switches 37, 47 are attached so as to be pressed by the projections 36, 46 formed on the paper cassettes when the paper cassettes are inserted to abut against the stoppers 57, 58. The presence of the paper cassette 3 or 4 and the type thereof are determined based upon the signal output from the switch 37 or 47.

Rollers 59, 60 are installed over the upper and lower cassette installation spaces 52, 53, respectively. One of the rollers 59, 60 is selectively driven by the main motor 27 based upon the user's choice of the print paper to be used. When the roller 59 or 60 rotates, the uppermost paper is drawn from the paper cassette 3 or 4 and fed to a paper feeding path 61 or 62.

Figure 4:
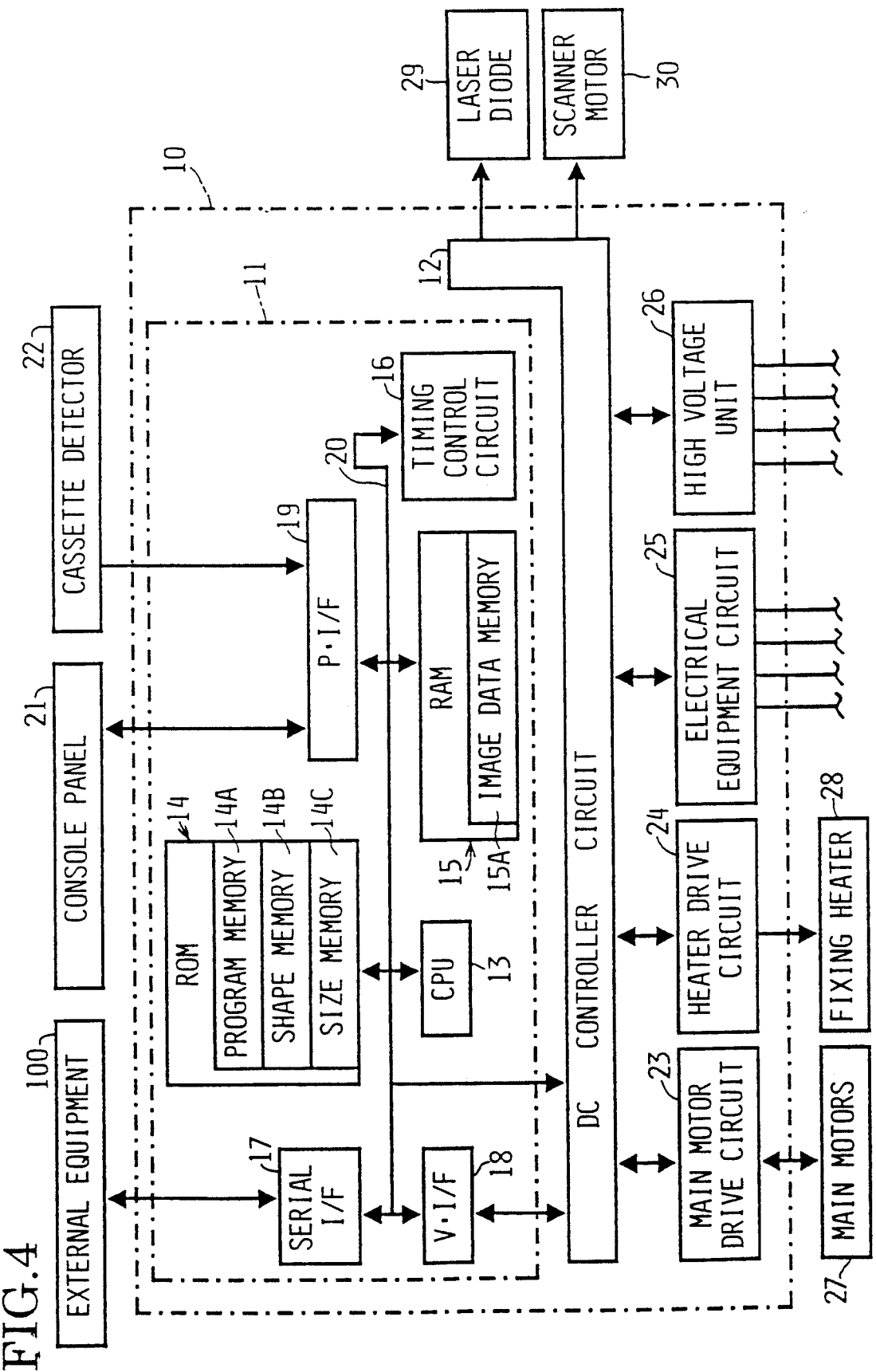
FIG. 4 is a block diagram of a control system of the printer.

A basic control system of the laser printer 1 is shown in the block diagram in FIG. 4.

The control unit 10 of the laser printer is provided with a video controller 11 and a DC controller circuit 12. The video controller 11 includes therein a CPU 13; a ROM 14 comprising a program memory 14A for storing therein various control programs inclusive of a print control program, a shape memory 14B for storing therein data indicative of the shape of marks to be printed in a mark print operation, and a size memory 14C for storing therein data indicative of a printable region; a RAM 15 comprising various memories including an image data memory 15A for storing therein image data (dot data) supplied from external equipment 100 such as a host computer; a timing control circuit 16 for generating a timing signal at the time of writing/reading the image data in/from the RAM 15; a serial interface (serial I/F) 17 for receiving the image data supplied from the external equipment 100; a video interface (V·I/F) 18 having two scan buffers of about 4K bytes and inputting the image data into the DC controller circuit 12 in sequence; and a panel interface (P·I/F) 19 for receiving signals output from the console panel 21 and a cassette detector 22; all of which are connected to each other via a bus 20 such as a data bus and an address bus.

The cassette detector 22 is adapted to detect, by the switches 37, 47, the fixed positions of the projections 36, 46 formed in the paper cassettes 3, 4, respectively, such disposed as described above, to output a paper size signal to the panel interface 19. Since there are top, bottom, right and left margins in the print paper P1, P2 where the printing cannot be performed with the restriction of a paper feed mechanism, in the size memory 14C of the ROM 14 is stored the printable region exclusive of the non-printable region for the type of the paper cassettes 3, 4, i.e., B5 and A4 sizes. The printable region of B5 size is represented by P1E; and the printable region of A4 size is represented by P2E.

Prior to the transmission of the image data, the external equipment 100 sends print start command data and data K1, K2 of a pair of corners in the diagonal relation for specifying a rectangular outline region OE including an image region and the like, all of which are stored in the image data memory 15A of the RAM 15.

To the DC controller circuit 12 are connected inside the control unit 10 a main motor drive circuit 23 for driving the main motors 27, a heater drive circuit 24 for driving a fixing heater 28, an electrical equipment circuit 25 for energizing various sensors and receiving detection signals therefrom, and a high voltage unit 26 for supplying a high voltage to the developing mechanism and the fixing mechanism. Additionally, a laser diode 29 comprising a light emitting element of a semiconductive laser and the scanner motor 30 for rotating the polygonal mirror adapted to deflect the laser beam emitted from the semiconductive laser are connected to the DC controller circuit 12.

Figure 5A:
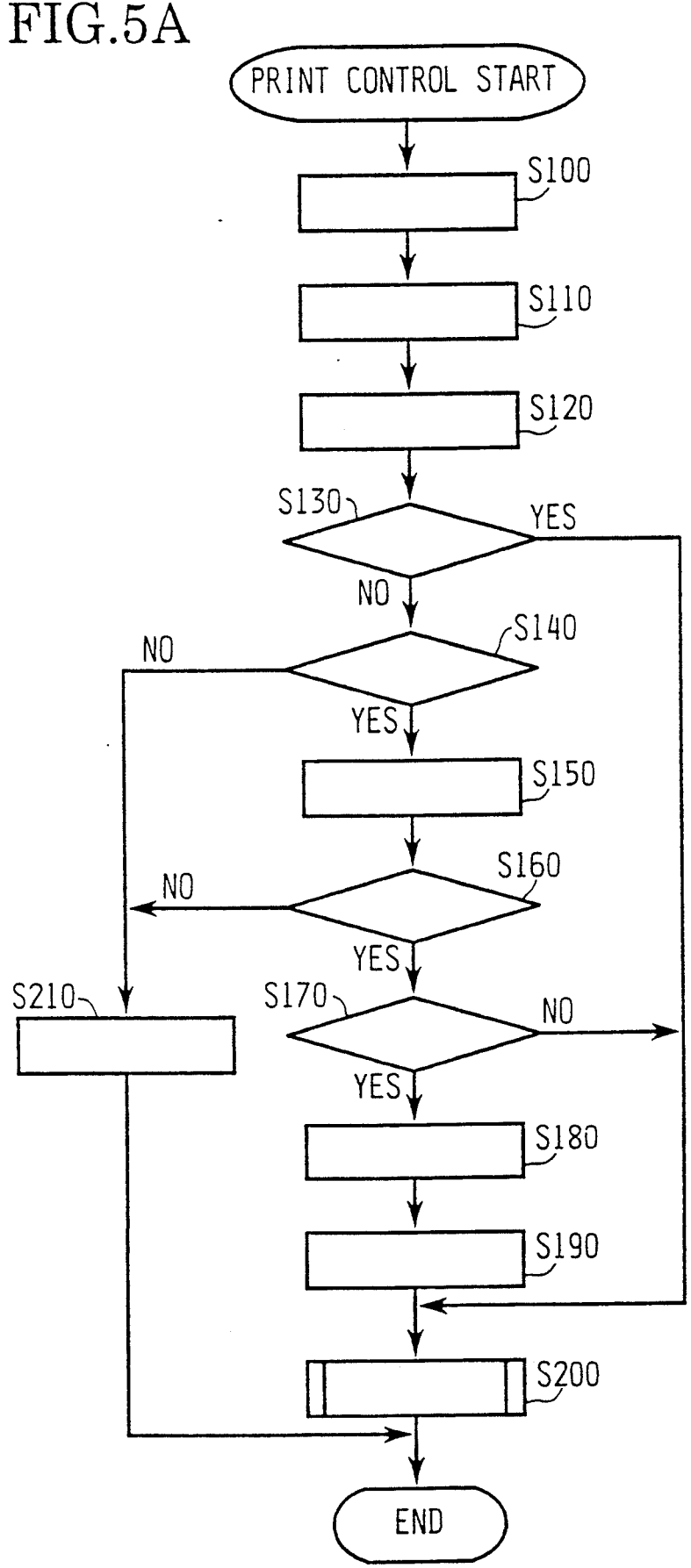

The routine of print control will be explained hereunder on the basis of the flowchart in FIG. 5 with reference to FIG. 6. In the flowchart, a symbol "S" connotes a step. In this case, the paper size B5 is selected by the paper size set key 21A.

Upon reception of the print start command from the external equipment 100, the print control is started, and then, data K1D, K2D representative of the positions of a pair of corners K1, K2 in the diagonal relation and the image data are stored in the image data memory (S100). Next, the type of the installed paper cassette 3 or 4 is detected on the basis of the paper size signal input into the panel interface 19 from the cassette detector 22, and the printable region P1E or P2E of the print paper P contained in the paper cassette 3 or 4 is read out from the size memory 14C (S110). The set state of mark printing is read in on the basis of the signal output from the mark print key 21D (S120).

Subsequently, when the rectangular outline region OE determined according to the data K1D, K2D representative of the pair of corners K1, K2, stored in the image data memory is smaller than the printable region P1E of B5 size selected at present by the set key 21A (Yes in S130), the image data is read out in sequence from the image data memory for the print operation since the operator sets the print paper P having a size sufficient that the whole image in the outline region can be printed (S200), thus leading to the completion of the control. However, when the outline region OE is larger than the printable region P1E (No in S130), it is determined in S140 on the basis of the paper size signal output from the cassette detector 22 whether or not the paper cassette having a size larger than B5 is set. If the paper cassette having the size larger than B5 is set (Yes in S140), the paper cassette 4 of a size larger than B5, i.e., A4 in this embodiment, is automatically selected by the program control (S150).

The outline region OE is compared with the printable region P2E of the selected A4 paper cassette 4. If the outline region OE is smaller than the printable region P2E (Yes in S160) and the mark printing is required (Yes in S170), the mark data is calculated (S180). When the answers in S140 and S160 are negative, the whole image cannot be printed on the print paper contained in the cassette selected at present. Consequently, error information is displayed on the display of the console panel 21, and an error processing is executed for indicating the impossibility of a print operation to the operator (S210), thus completing the control.

Figure 6:
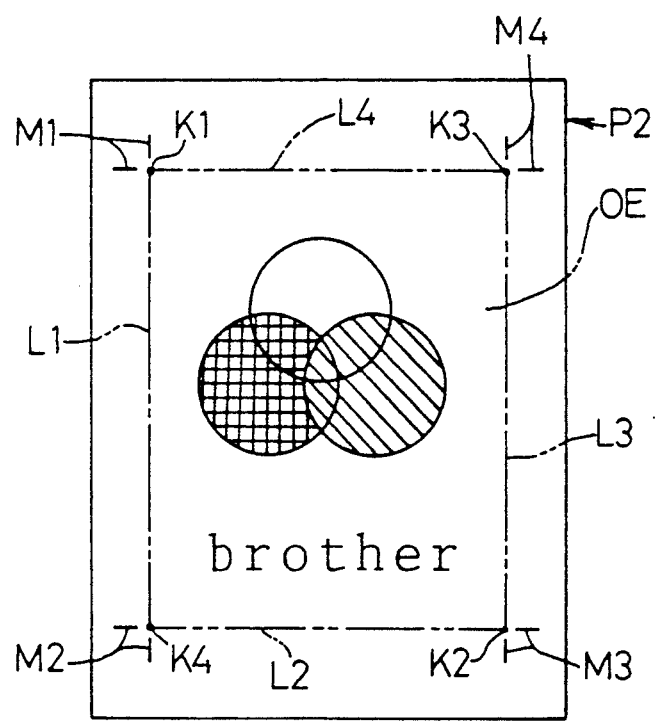
FIG. 6 illustrates an example of a printed image and printed marks.

In the calculation of the mark data in S180 as shown in FIG. 6, data K3D and K4D of one pair of corners K3 and K4 are calculated by the outline region OE determined on the basis of the data K1D and K2D of the other pair of corners K1 and K2. Furthermore, on the basis of the data K1D to K4D of the four corners, an imaginary boundary L1 passing through a pair of corners K1 and K4, an imaginary boundary L2 passing through a pair of corners K2 and K4, an imaginary boundary L3 passing through a pair of corners K2 and K3, and an imaginary boundary L4 passing through a pair of corners K1 and K3, respectively, are calculated. Next, data of linear marks M1 on the extension lines of the pair of boundaries L1 and L4 in the vicinity of the corner K1 is calculated on the basis of the pair of boundaries L1 and L4 and the corner data K1D. In the same manner, data of linear marks M2 on the extension lines of the pair of boundaries L1 and L2 in the vicinity of the corner K4 is calculated on the basis of the pair of boundaries L1 and L2 and the corner data K4D, data of linear marks M3 on the extension lines of the pair of boundaries L2 and L3 in the vicinity of the corner K2 is calculated on the basis of the pair of boundaries L2 and L3 and the corner data K2D, and data of linear marks M4 on the extension lines of the pair of boundaries L3 and L4 in the vicinity of the corner K3 is calculated on the basis of the pair of boundaries L3 and L4 and the corner data K3D. The marks M1 to M4 are identical in shape and different in print position and print direction. The mark data indicative of the marks M1 to M4 contains therein such information as the print positions and print directions of the marks M1 to M4 and the shape of the marks read out from the shape memory 14B.

The mark data calculated in S180 is synthesized with the image data read out from the image data memory so that synthesized image data is produced (S190). The image data stored in the image data memory 15A is replaced with the synthesized image data. As a result, in the image data memory 15A is stored the image data synthesized with the image data representative of the marks M1 to M4 indicative of the cut positions around the image data arranged corresponding to the size of the outline region OE determined by the data K1D and K2D indicative of the positions of the corners K1 and K2. The synthesized image data stored in the image data memory is read out in sequence for the print operation (S200).

Consequently, as shown in FIG. 6, the original image to be printed, which is output from the external equipment 100, is printed on the print paper P2. At the same time, the linear marks M1 to M4 are printed on the four extension lines of the virtual boundaries L1 to L4 at the four corners of the outline region OE. The operator cuts the print paper P2 along the extension lines of the marks M1 to M4, whereby the cutting work of the print paper P2 can be remarkably simplified.

In addition, even if the print paper is fed in the inclined state and the image output from the external equipment 100 is printed in the state inclined with respect to the print paper, the marks M1 to M4 are always printed in the correct cut positions with reference to the actual print state of the output image so that the print paper can be cut in the predetermined correct positions with respect to the actual print position of the image to be printed on the basis of the marks M1 to M4.

Linear arrows and other various shapes can be used as the marks. In this case, the same operation can be performed if data indicative of a desired shape is previously stored in the shape memory 14B.

The Operation can be changed for the mark print operation irrespective of the operation of the mark print key 21D by the operator whenever the outline region OE is smaller than the printable region P1E or P2E.

The print operation of the marks indicative of the cut positions may be performed by controlling the controller inside the printer on the basis of the command sent from the external equipment 100.

It is obvious that the printer according to the present invention can be applied to a printer such as a thermal printer, a wire dot printer and an ink jet printer each capable of printing an image.

While this invention has been described in conjunction with a specific embodiment thereof, it is evident that many alternatives, modifications and variations will be apparent to those skilled in the art. Accordingly, the preferred embodiment of the invention as set forth herein is intended to be illustrative, not limiting. Various changes may be made without departing from the spirit and scope of the invention as defined in the following claims.

What is claimed is:

1. A printer for printing an image based on image data and data representative of a print region supplied from an exterior, said printer comprising:
    an image data memory for storing the supplied image data and for storing data of at least a pair of corners located in a diagonal relationship with respect to one another, said corner data specifying a rectangular outline region bounded by boundary lines, said rectangular outline region including an image region;
    print means for printing the image on a print medium on the basis of the image data stored in the image data memory;
    mark data producing means for producing mark data corresponding to marks to be printed on extension lines of a pair of the boundary lines which are perpendicular to each other, said mark data specifying the rectangular outline region in a vicinity of at least the pair of corners in the diagonal relation on the basis of the data of the pair of corners of the rectangular outline region stored in the image data memory;
    synthesizing means for synthesizing the image data supplied from the exterior into the image data memory and the mark data produced by the mark data producing means so as to produce synthetic image data;
    print control means for controlling the print means to print both the image on the basis of the image data supplied from the exterior and the marks on the basis of the mark data produced by the mark data producing means according to the synthetic image data produced by the synthesizing means; and
    storage means for storing printable region data indicative of printable regions corresponding to different sized print media, wherein said printing is performed only when the specified outline region is smaller than a printable region corresponding to a desired print medium.

2. The printer according to claim 1, wherein the mark data producing means produces linear marks on the basis of the mark data.

3. The printer according to claim 1, wherein said printer includes at least two paper cassettes, each of said paper cassettes accommodating a print medium of a different size.

4. The printer according to claim 3, wherein said printer includes detection means for detecting the presence of the paper cassettes and the size of print medium accommodated by each of said paper cassettes.

5. The printer according to claim 1, wherein said print control means includes a mark print key for providing a signal that marks are to be printed on the print medium.

6. The printer according to claim 5, wherein said printer includes a set key for selecting said desired print medium.

7. The printer according to claim 6, wherein said printer includes determining means for determining whether the specified rectangular outline region is smaller than said printable region corresponding to the selected, print medium selected by the set key.

8. The printer according to claim 7, wherein said print control means controls the print means to print the image and the marks when the determining means determines that the specified rectangular outline region is smaller than the printable region and said print control means automatically selects a print medium larger than the selected print medium by ignoring the print medium selected by the set key when the determining means determines that the specified rectangular outline region is larger than the printable region.

9. A printer for printing an image based on image data and data representative of a print region, said printer comprising:
    image data memory means for storing the image data and for storing corner data specifying at least two diagonal corners of a rectangular outline region bounded by boundary lines, said rectangular outline region including an image region;
    mark data producing means for producing mark data corresponding to marks to be provided in a vicinity of the diagonal corners, said marks to be printed on extension lines of at least a pair of the boundary lines which are perpendicular to one another;
    print means for printing the image on a print medium on the basis of the image data stored in the image data memory means;
    print control means for controlling the print means to print both the image on the basis of the image data and the marks on the basis of the mark data; and
    storage means for storing printable region data indicative of printable regions corresponding to different sized print media, wherein said printing is performed only when the specified outline region is smaller than a printable region corresponding to a desired print medium.

10. The printer according to claim 9, wherein said print control means includes signal providing means for providing a signal indicative that said marks are to be printed on the print medium.

11. The printer according to claim 10, wherein said printer includes selection means for selecting said desired print medium.

12. The printer according to claim 11, wherein said printer includes determining means for determining whether the specified rectangular outline region is smaller than said printable region corresponding to the selected print medium.

13. The printer according to claim 9, wherein said printer includes a plurality of paper cassettes, each cassette accommodating a print medium of a different size.

14. The printer according to claim 13, wherein said printer includes detection means for detecting paper cassette presence and the size of the print medium accommodated by each of the paper cassettes.

15. A method of printing an image based on image data and data representative of a print region, said method comprising the steps of:

storing image data and corner data, said corner data specifying at least two diagonal corners of a rectangular outline region bounded by boundary lines, said rectangular outline region including an image region;

producing mark data corresponding to marks to be printed in a vicinity of the diagonal corners, said marks to be printed on extension lines of at least a pair of the boundary lines which are perpendicular to one another, said marks to be printed in a region exterior to said rectangular outline region;

printing the image on a print medium such that both the image and the marks are printed; and storing printable region data indicative of printable regions corresponding to different sized print media, wherein said printing is performed only when the specified outline region is smaller than a printable region corresponding to a desired print medium.

* * * * *